(12) United States Patent
Connolly et al.

(10) Patent No.: US 8,496,548 B2
(45) Date of Patent: Jul. 30, 2013

(54) WIDE-BODY ARROW HAVING TAPERED TAIL

(76) Inventors: Martin T. Connolly, San Diego, CA (US); Tod Boretto, San Diego, CA (US)

( * ) Notice: Subject to any disclaimer, the term of this patent is extended or adjusted under 35 U.S.C. 154(b) by 0 days.

(21) Appl. No.: 12/943,870

(22) Filed: Nov. 10, 2010

(65) Prior Publication Data

US 2012/0115655 A1    May 10, 2012

(51) Int. Cl.
    *F42B 6/04*    (2006.01)
(52) U.S. Cl.
    USPC .......................................... 473/578; 473/586
(58) Field of Classification Search
    USPC .......................................... 473/578, 585, 586
    See application file for complete search history.

(56) References Cited

U.S. PATENT DOCUMENTS

| | | | | |
|---|---|---|---|---|
| 4,204,307 A | * | 5/1980 | Pfetzing | 29/407.09 |
| 4,645,211 A | * | 2/1987 | Beiter | 473/578 |
| 4,706,965 A | * | 11/1987 | Schaar | 473/578 |
| 5,154,432 A | * | 10/1992 | Saunders | 473/578 |
| 5,417,439 A | * | 5/1995 | Bickel | 473/578 |
| 6,017,284 A | * | 1/2000 | Giles | 473/578 |
| 2009/0291785 A1 | * | 11/2009 | Smith | 473/578 |

OTHER PUBLICATIONS

Tim Dehn, "Gold Tip Arrow Production Bounces Back From Involuntary Plant Closure", Arrow Trade Magazine, United States.
Patrick Meitin, "Fat or Thin, Arrow Suppliers Have 3D Shooters Covered", Arrow Trade Magazine, Jan. 2007, United States.

* cited by examiner

*Primary Examiner* — John Ricci
(74) *Attorney, Agent, or Firm* — Gary L. Eastman, Esq.

(57) ABSTRACT

A cylindrical carbon fiber arrow shaft formed with an increased external diameter of 0.380 inches. This arrow shaft is formed with an axial bore which has a first internal diameter throughout a substantial portion of the shaft length, and a second, smaller, internal diameter throughout the fletching end of the arrow. The second internal diameter corresponds to the internal diameter of standard arrows having external diameters of 0.295 inches. Using this standard internal diameter at the fletching-end of the arrow, standard nocks may be used without the need for any spacer or insert, thereby decreasing fletching-end weight significantly and providing for the proper and more desired location of the center of gravity forward on the arrow.

14 Claims, 3 Drawing Sheets

WIDE-BODY ARROW HAVING TAPERED TAIL

RELATED APPLICATION

The present application claims the benefit of priority to U.S. Provisional Patent Application Ser. No. 60/880,939 filed Jan. 16, 2007.

FIELD OF THE INVENTION

The present invention relates generally to archery. The present invention is more particularly, though not exclusively, useful as an improved archery arrow having improved weight distribution and aerodynamics.

BACKGROUND OF THE INVENTION

Archery arrows have been in use for centuries. Over this timer period, significant improvements have been made in the design of the arrows. For instance, the materials used for arrows have evolved from ancient arrows made of wood to modern arrows fabricated using lightweight high strength carbon fiber composites. Also, the Fletching, or Finning, has evolved from a standard X-shape feather to an aerodynamic three-tab design which minimizes contact with the bow and improves accuracy. Improvements have also been made to the arrow head to improve aerodynamics and to the nock to decrease weight, for instance.

A recent trend in the arrow industry is to provide an arrow having a wider diameter shaft. Typical arrows have had a standard external shaft diameter of 0.295 inches which has provided for a reasonably rigid arrow made from today's materials. However, a thicker arrow having an external shaft diameter of 0.380 has been developed for certain archery applications.

However, with the wider diameter of these thicker arrows comes an increase in weight and aerodynamic drag caused by the larger cross-section. In order to minimize the effects of the larger diameter on the arrow performance, the industry has taken steps to minimize weight of the arrow. For instance, some manufacturers have provided adaptors which can allow the archer to use standard diameter nocks. However, in order to use the smaller diameter nocks, a transitional sleeve, or taper, must be inserted between the shaft and the nock. Unfortunately, this added insert provides excess weight at the fletching end of the arrow. This is particularly so when using carbon-fiber arrows where the weight of the arrow is small compared to the weight of the tip and nock.

In light of the above, it would be advantageous to provide an arrow having increased strength and decreased drag which is also lightweight. It would also be advantageous to provide an arrow capable of using standard nocks without having to add weight-increasing adapters and inserts.

SUMMARY OF THE INVENTION

The present invention includes a cylindrical carbon fiber arrow shaft formed with an increased external diameter of 0.380 inches. This arrow shaft is formed with an axial bore which has a first internal diameter throughout a substantial portion of the shaft length, and a second, smaller, internal diameter throughout the fletching end of the arrow. The second internal diameter corresponds to the internal diameter of standard arrows having external diameters of 0.295 inches. Using this standard internal diameter at the fletching-end of the arrow, standard nocks may be used without the need for any spacer or insert, thereby decreasing fletching-end weight significantly and providing for the proper and more desired location of the center of gravity forward on the arrow.

The dual interior-diameter design of the arrow of the present invention is accomplished using a cylindrical mandrel having two external diameters. The first mandrel diameter corresponds to the portion of the arrow shaft having the external diameter of 0.380 inches, and the second mandrel diameter corresponds to the standard nock dimensions.

The carbon fiber shaft is formed on the mandrel. With the aid of releasing agents, the mandrel is removed leaving a tubular shaft having a decreased internal diameter at the fletching end of the arrow. A taper is formed at the end of the arrow to provide for a smooth transition between the arrow shaft and the smaller-diameter nock. A nock is then inserted, the fletching is applied, and a tip is installed to provide a high strength, low weight archery arrow having less mass than comparable arrows.

DESCRIPTION OF THE DRAWING

The objects, features, and advantages of the method according to the invention will be more clearly perceived from the following detailed description, when read in conjunction with the accompanying drawing, in which.

DETAILED DESCRIPTION

Figure 1:
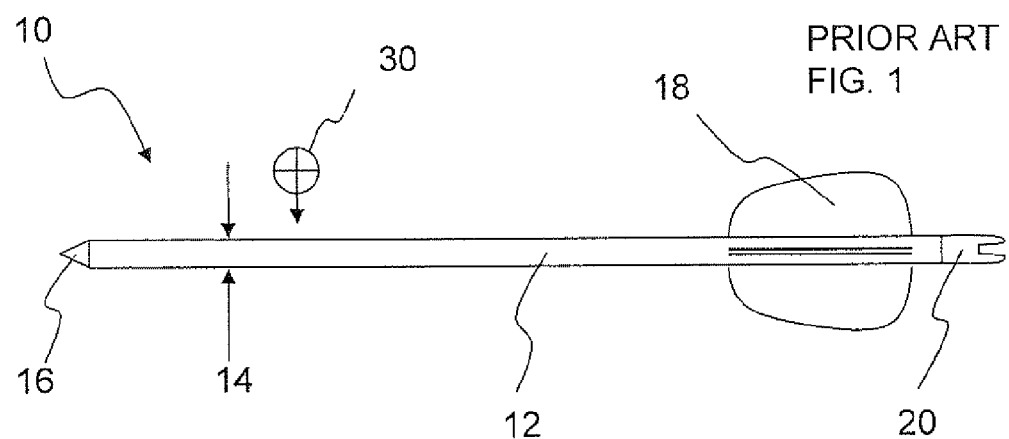
FIG. 1 is a side view of a PRIOR ART arrow showing the small exterior diameter and placement of the tip, fletching and nock, and an exemplary center-of-gravity.

Referring now to FIG. 1, a side view of a PRIOR ART arrow 10 is shown detailing the small exterior diameter 14 and placement of the tip 16, fletching 18 and nock 20. As is known in the industry, the length of the arrow, the weight of the tip and fletching determines in large part the location of the center-of-gravity 30 of the arrow. It is also known in the industry that the placement of the center of gravity in positions along the length of an arrow can significantly affect the flight of the arrow.

The nock can also affect the position of the center of gravity. For instance, in arrows having very low weights, the addition of the nock at the end of the arrow can bring the center of gravity away from the tip, sometimes resulting in a less-than-optimum placement.

Figure 2:
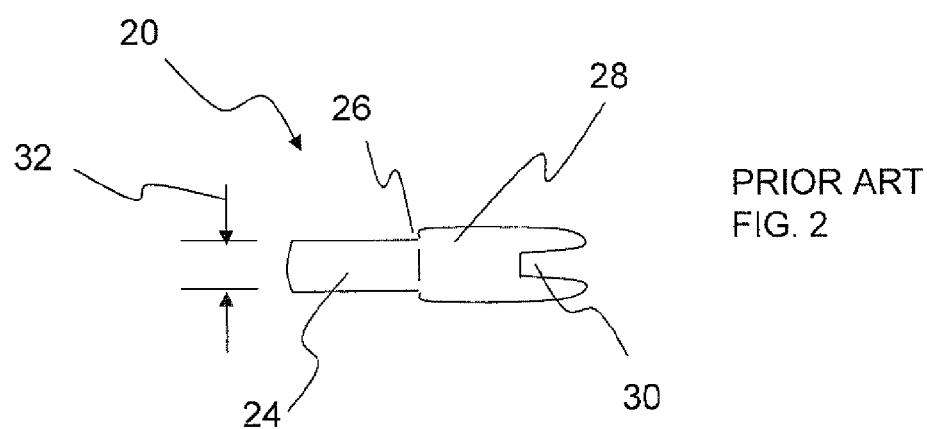
FIG. 2 is a detailed view of a standard nock as used in conjunction with small exterior diameter arrows and showing the insert and bow receiver.

FIG. 2 is a detailed view of a standard nock 20 as used in conjunction with small exterior diameter arrows 10. Nock 20 includes an insert 24 leading through a stop 26 to a body 28 formed with a bow receiver 30. The diameter 32 of the insert 24 is such that the insert is closely and securely received in the bore of an arrow shaft. Additionally, an adhesive may be applied when inserting the insert into the shaft to provide added strength for the retention of the nock.

Figure 3:
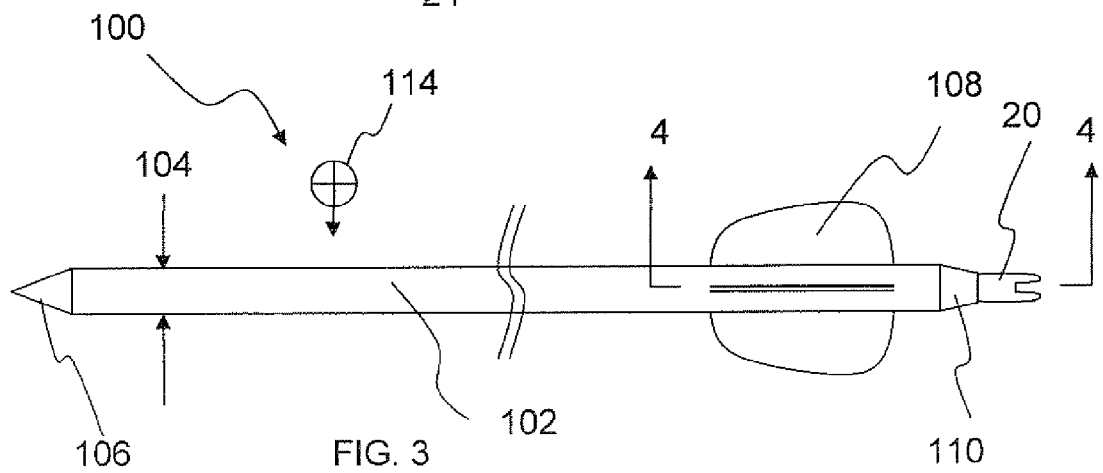
FIG. 3 is a side view of an arrow of the present invention having a wider exterior diameter and having a tip, fletching, nock, and formed with a tapered portion of the carbon fiber body into which the nock is inserted, as well as an exemplary center-of-gravity.

Referring now to FIG. 3, a side view of arrow 100 of the present invention has a shaft 102 having a wider exterior diameter 104. In a preferred embodiment, the exterior diameter is 0.380 inches, however, it is to be appreciated that other diameters could be contemplated without departing from the present invention.

Arrow 100 includes a tip 106 which is typically a weighty metallic material, such as steel, and can be formed with different shapes for specific uses, such as target shooting, hunting, etc. Retching 108 is attached to the exterior of body 102 as is known in the art, and nock 20 is inserted into the fetching end of the shaft body 102.

Arrow shaft 102 is formed with an axial bore (shown in FIG. 4) and formed with tapered portion 110 which has an interior diameter which corresponds to the interior diameter of standard 0.295 inch arrows. Using this standard internal diameter at the fletching-end of the arrow, standard nocks may be used without the need for any spacer or insert, thereby decreasing fletching-end weight significantly and providing for the proper and more desired location of the center of gravity forward on the arrow.

Arrow 100 is shown having an exemplary center-of-gravity 114 which as is known in the art, may be adjusted along the length of the shaft 102 by adjusting the weights of the tip 106, fletching 108 and nock 20. Also, the position of the center of gravity may be affected by the shortening, or cutting, of the length of the arrow.

Figure 4:
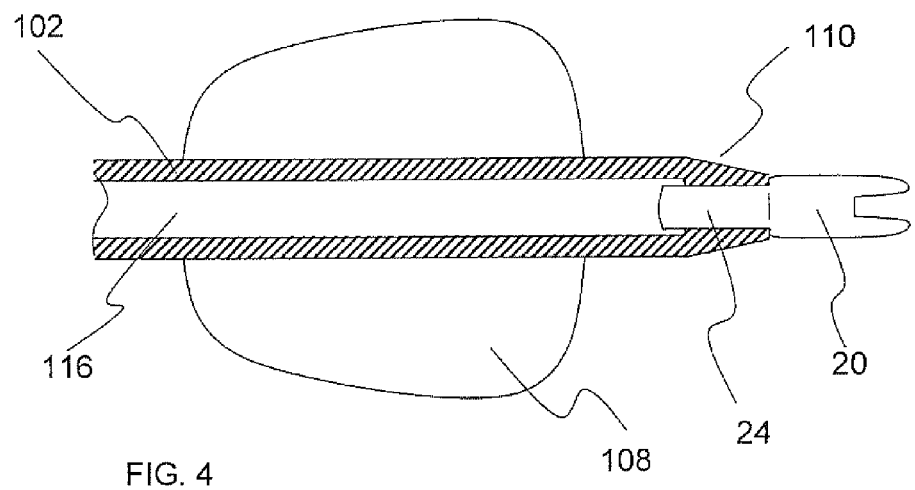
FIG. 4 is a cross-sectional view of the fletching end of the arrow of the present invention showing the portion of the arrow having a smaller internal diameter sized to closely receive a standard nock.

FIG. 4 is a cross-sectional view of the arrow 100 of the present invention taken along line 4-4 of FIG. 3, and showing the portion of the arrow 100 having a smaller internal diameter sized to closely receive a standard nock 20. Specifically, shaft 102 is formed with a bore 116 having a transition at the nock-end of the arrow to a smaller diameter bore sized to receive the insert 24 of nock 20.

A tapered section 110 of body 102 transitions the arrow from the larger diameter of 0.380 inches, to a smaller diameter, such as 0.295 inches to correspond to the diameter of the nock 20. The length of the taper and the angle of the taper can vary depending on the manufacturing of the arrow 100 without departing from the spirit of the present invention.

Figure 5:
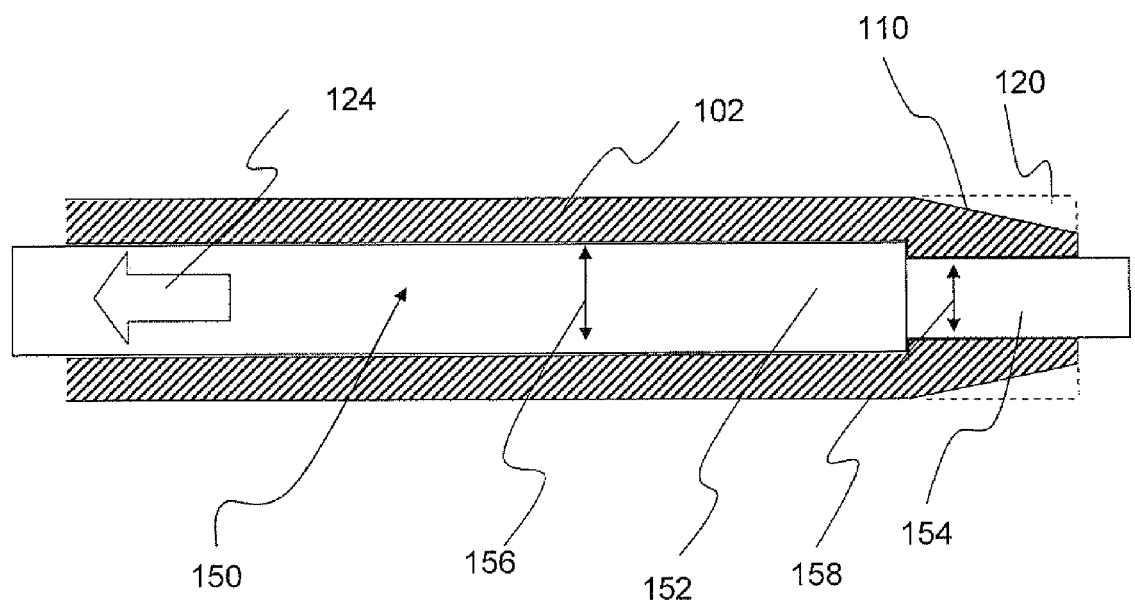
FIG. 5 is a cross-sectional view of the arrow of the present invention showing the placement of a mandrel having two diameters positioned to form an arrow body having a first diameter, and a fletching portion having a smaller diameter, and also showing the formation of the taper by removing a portion of the carbon fiber materials, such as by grinding.

An example of a typical manufacturing method is depicted in FIG. 5. Carbon fiber manufacturing is known in the art, and includes the wrapping of carbon fibers around a mandrel which is then heated and formed into the desired article of manufacture. For the present invention, a cross-sectional view of the arrow 100 of the present invention shows the use of a mandrel 150 having two sections 152 and 154. Section 152 has a diameter 156, and section 154 has a diameter 158. These diameters 156 and 158 cooperate to form an arrow body 102 having a first larger diameter 156, and a fletching portion having a smaller diameter 158 which corresponds to the standard nock dimensions.

Tapered section 110 is formed on the fletching end of body 102 by removing a portion 120 of the carbon fiber materials as shown by dashed lines. The removal of the material of body 102 may be accomplished using a variety of techniques, such as by grinding as is known in the art.

Figure 6:
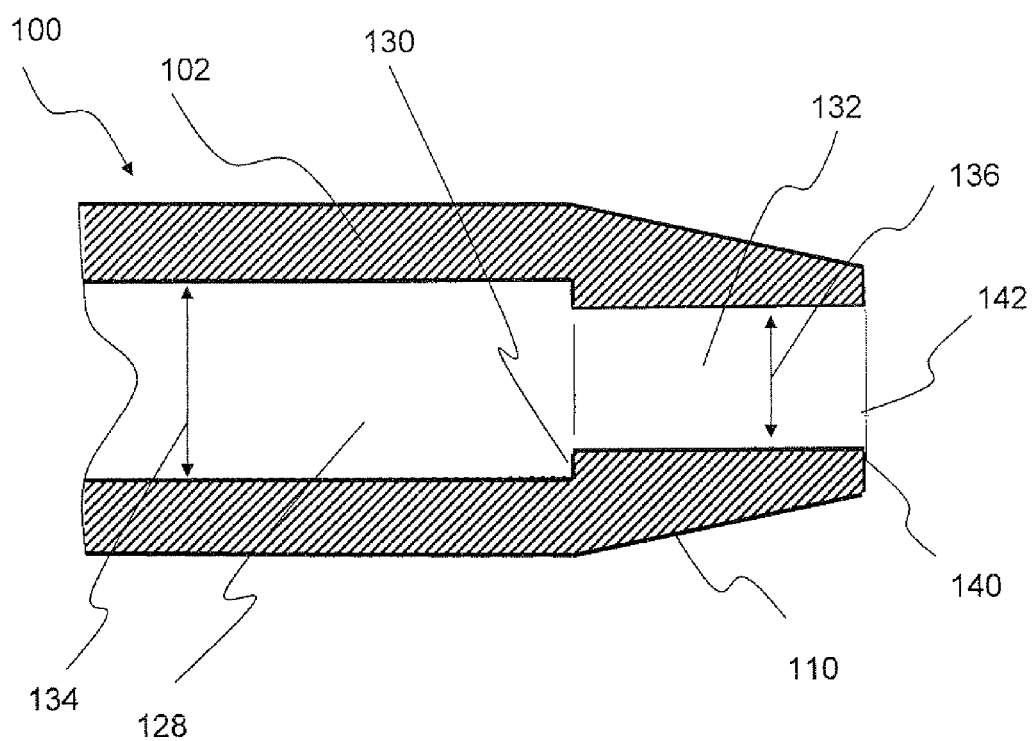
FIG. 6 is a cross-section of the fletching end of an arrow showing the first internal body diameter and the second smaller internal body diameter, and the transition stop, as well as the nock receptor formed to receive a standard nock

FIG. 6 is a cross-section of the fletching end of arrow 100 showing the first internal body diameter 134 and the second smaller internal body diameter 136. Body 102 is formed with a transition stop 130 between diameters 134 and 136. By decreasing the diameter 136 of body 102, there is sufficient strength in the materials of the shaft so that nock 20 (not shown this Figure) is securely received in the shaft.

Moreover, by forming the diameter 136 of inlet 132 to receive a standard lightweight nock, the weight of the arrow assembly is decreased, as well as making a more cost-effective arrow.

The arrow of the present invention exhibits improved aerodynamics, lower mass, and has a better weight distribution than other large diameter arrows which require the use of heavy transition pieces, or super-sized nocks. The use of the standard nock without any additional hardware provides the arrow of the present invention with a significant advantage over other arrows.

We claim:

1. An arrow comprising:
a cylindrical arrow shaft formed having a length extending from a tip end to a fletching end and having an external diameter, said shaft formed with an axial bore which has a first internal diameter throughout a substantial portion of the shaft length, and a second internal diameter throughout the fletching end;
a tip attachable to said tip end of said shaft;
fletching attachable to said shaft adjacent to said fletching end;
a tapered section on said fletching end, said tapered section having a taper toward said fletching end of said shaft;
a nock attachable to said fletching end of said shaft; and
a transition stop, perpendicular to said axial bore, between said first internal diameter and second internal diameter.

2. The arrow of claim 1, wherein said first internal diameter is larger than said second internal diameter.

3. The arrow of claim 1, wherein said taper at said fletching end has a diameter approximately equal to the outer diameter of a nock body.

4. The arrow of claim 1, wherein said second internal diameter is between 0.24 and 0.26 inches.

5. The arrow of claim 1, wherein said first internal diameter is between 0.33 and 0.38 inches.

6. The arrow of claim 1, wherein said diameter of said fletching end is between 0.29 and 0.33 inches.

7. The arrow of claim 1, wherein said external diameter is between 0.35 and 0.39 inches.

8. The arrow of claim 1, wherein the external diameter of said shaft is 0.38 inches.

9. The arrow of claim 1, wherein said shaft is made from a carbon fiber composite.

10. The arrow of claim 1, wherein said shaft is further formed with an axial bore which has a first internal diameter throughout a substantial portion of the shaft length, and a second, smaller, internal diameter throughout the fletching end of the arrow.

11. The arrow of claim 10, wherein said second internal diameter corresponds to the internal diameter of standard arrows having external diameters of 0.295 inches, and sized to receive a standard-sized nock.

12. The arrow of claim 1, wherein said tapered section of said shaft transitions from a larger diameter of 0.380 inches, to a smaller diameter.

13. The arrow of claim 12, wherein said smaller diameter is 0.295 inches corresponding to the diameter of said standard-sized nock.

14. The arrow of claim 1 wherein said nock further comprises an insert leading through a stop to a body formed with a bow receiver, wherein the diameter of the insert is sized to be closely and securely received in said bore of the shaft.

\* \* \* \* \*